United States Patent Office 3,071,444
Patented Jan. 1, 1963

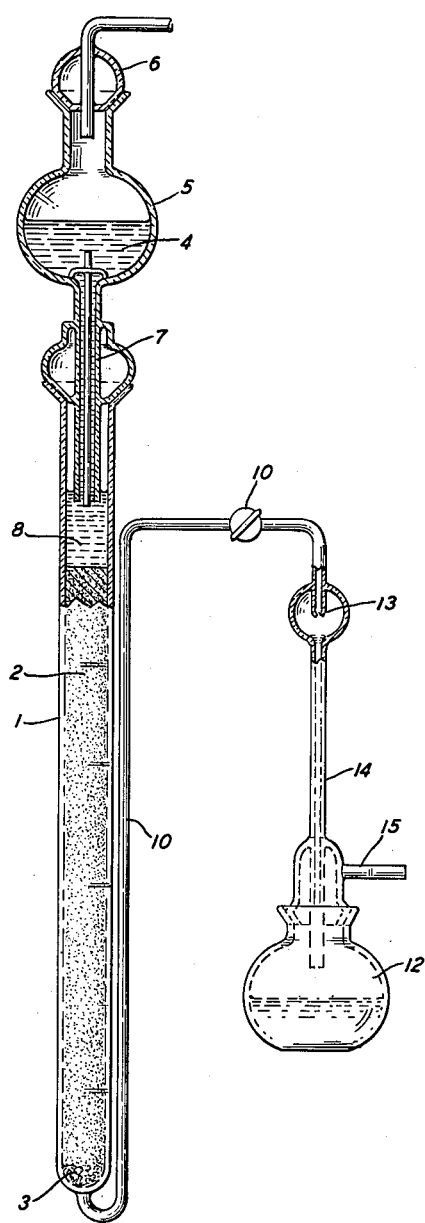
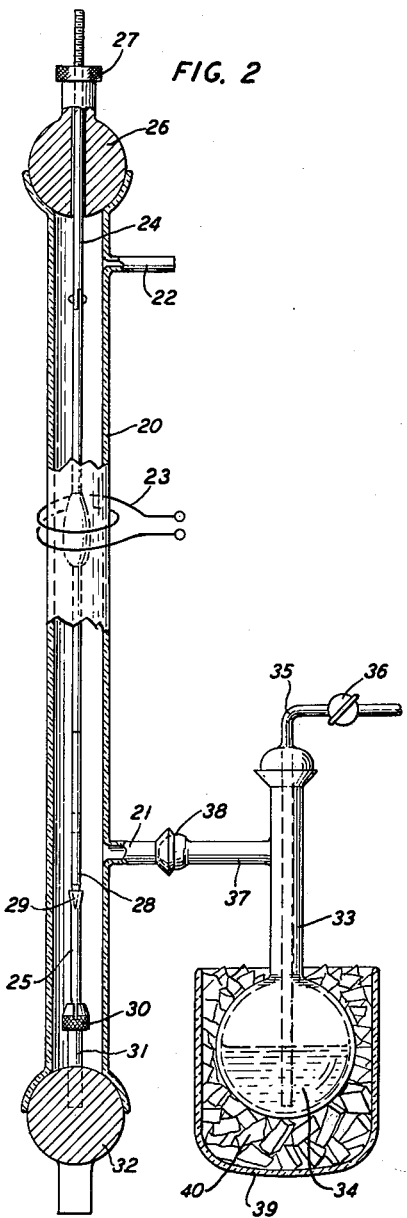

3,071,444
PREPARATION OF PURIFIED SEMICONDUCTOR MATERIAL
Henry C. Theuerer, New York, N.Y., assignor to Bell Telephone Laboratories, Incorporated, New York, N.Y., a corporation of New York
Filed Dec. 16, 1958, Ser. No. 780,828
3 Claims. (Cl. 23—223.5)

This invention relates to the purification of chloride-containing compounds of germanium and silicon. Halides purified in accordance with this invention are of particular interest as intermediate products in the preparation of the corresponding elements. Although, in the main, by reason of the rapidly growing semiconductor device field, interest is centered on the conventional preparation of such elemental materials, purified halides prepared in accordance with the instant invention are of interest in other arts, as in the preparation of ultrapure silane.

The stringent design requirements of present day semiconductor devices such as transistors and rectifiers have resulted in demands for purer and purer semiconductive materials. The growing importance of this field has had a major impact on related metallurgical processing fields, resulting in the development of purification methods pushing the impurity levels of materials so processed to infinitesimal limits hitherto thought unattainable. Processes have been developed for pushing the impurity level in such materials to one part in a million, to one part in a billion, and orders of magnitude lower, and still separation problems exist which must be overcome before many of the most recently designed semiconductor devices can be put into commercial production.

A particular problem exists in the processing of silicon and germanium where impurities to be removed have distribution coefficients in such materials between the liquid and the solid phases approaching unity. In such instances, the use of conventional zone-melting techniques is not a complete answer. In particular, where materials undergoing processing are high melting and/or react with or are contaminated by any of the well-known crucible materials so that use of molten regions uncontacted by solid retaining materials is dictated, so that the zone-melting process must take the form of floating zone technique or other related procedure, the problem is a serious one.

Where such liquid-solid distribution coefficients are unfavorable and where, for other reasons, zone-melting treatment becomes an expensive processing step, studies have been made of the possibility of purifying gas phase compositions of a semiconductive material. One such procedure, the hydrogen reduction of halide materials such as silicon tetrachloride and other halides containing one or more hydrogen atoms such as silicon chloroform, is now in widespread commercial use. Other such procedures include the hydrolysis of germanium tetrachloride to the corresponding oxide. It has been found that such reduction over tantalum or tungsten filaments, followed by leaching of the filament material from the crystal, and finally by floating zone-melting to produce the desired crystalline configuration results in the efficient removal of virtually all impurities of concern from the elemental product. The favorability of the vapor phase distribution coefficients of many impurities in such halided semiconductive materials has resulted also in many other procedures utilizing such intermediate products. An example of such procedure is the removal of arsenic acid from germanium tetrachloride by distillation as well as extraction methods.

It is, however, the nature of the starting materials in the procedures used in the preparation of the starting chlorided materials that certain impurities are chlorinated along with the material of concern, and that certain of these materials are removed only with difficulty. Impurity materials of this nature of particular concern from a semiconductor device standpoint are boron and phosphorus, both of which readily form chlorides which are reduced over tantalum or tungsten by hydrogen reduction along with the semiconductor. Although some of the best available semiconductive materials are produced by this procedure, the continuing presence of small amounts of such impurities constitutes a limitation in device use. This limitation on the hydrogen reduction process is assuming increasing importance as modern device designs become increasingly exacting.

In accordance with this invention, techniques have been found for reducing impurity content to levels not before attainable on a production basis. Elemental materials such as silicon produced in accordance with this invention may have resistivity levels as high as 10,000 ohm-cm. or higher and total significant impurity content as low as of the order of $1 \times 10^{12}$ atoms per cubic centimeter.

Procedures described herein accounting for such improved end product include liquid phase treatment of initial halogenated material and may also include an improved reduction procedure obviating the need for filamentary materials such as the tantalum and tungsten generally used.

In accordance with this invention it has been found that elemental silicon and germanium having an extremely low boron and phosphorus level may be prepared by the treatment of corresponding halogenated materials such as the tetrachlorides and various chlorosilanes with certain absorbent materials. These procedures are preferably carried out in absorption columns. Although, in general, it is the apparent effect of such absorbents to remove equal amounts of boron and phosphorus, a further pre-treatment method, described herein, may result in the increased removal of boron, so further purifying the end product. Another aspect of the invention involves the hydrogen reduction of such halogenated materials over filaments or thin rods of semiconductive materials themselves. Another pre-treatment method, also here described, results in the efficient removal of sulfur-containing materials, so avoiding any complications which may be introduced by such contaminants during subsequent processing.

The invention is more easily understood by reference to the accompanying drawings, in which:

FIG. 1 is a schematic front elevational view, partly in section, of one type of absorption column found suitable in the practice of this invention; and FIG. 2 is a front elevational view, partly in section, of apparatus suitable for use in the hydrogen reduction of halogenated materials over silicon or germanium filaments.

With further reference to FIG. 1, there is depicted an absorption column 1 made of Pyrex glass or other suitable material which is filled to the height indicated with absorbent material 2 and which further contains a small amount of quartz wool or other filter material 3 at its lower end to prevent escape of absorbent material. In operation, the halogenated material 4 to be processed is inserted in reservoir 5, which is fitted with a vented stopcock 6. Vented stopper arrangement 7 permits smooth flow of halogenated material 4 from reservoir 5 to column 1, where it may initially lie on top of packed portion 2 on the top of the column in region 8, depending on flow conditions. Flow rate through the column is controlled by valve 10 in siphon tube 11 which connects column 1 with column tank 12. Material flowing through valve 10, which may be made of Teflon, flows through drip nozzle 13, through tube 14, into the column tank 12. Blocks are prevented by venting tube 15.

FIG. 2 is illustrative of a type of apparatus suitable for use in the preferred procedure for reducing purified halogenated materials to their elemental counterparts in accordance with this invention. This apparatus, although preferred over conventional tantalum or tungsten filament apparatus, is not required in accordance with this invention. Materials reduced in conventional manner may be of sufficient purity to be suitable for use in present devices.

The apparatus depicted in FIG. 2 is suited for both reduction and floating zone-melting. It includes a quartz tube 20, fitted with entrance and exit tubes 21 and 22, respectively, by means of which a flow of halogenated material and hydrogen is maintained through tube 20 and is fitted with a heating means 23 which may be an induction coil connected with a high frequency source not shown, fitted so as to be movable with respect to column 20. Internally, tube 20 is fitted with two crystal holders, upper holder 24 and lower holder 25. Upper holder 24 is a nickel rod which passes through a closure such as nickel or gold-plated brass stopper 26, is threaded at its upper extremity, and is fitted with a knurled nut 27 provided for vertical adjustment of the holder. Lower holder 25 may be made of quartz, is adapted to accept a support crystal 28 at 29 and is, in turn, held by chuck 30, which may be made of nickel. Chuck 30 is attached to spindle 31, which is mechanically attached to head 32, which may be made of nickel or gold-plated brass and which may be mounted on a drive carriage, not shown, so as to move the entire assembly with respect to induction heater 23. Alternatively, head 32 may be attached to a stationary member, with provision being made for movement of heater 23. The remaining portion of the apparatus shown in FIG. 2 has been found suitable for the introduction of hydrogen and halogenated material. This apparatus consists of flask 33 containing silicon tetrachloride or other halogenated material 34 provided with immersed entrance tube 35, which is connected with a source of purified hydrogen, not shown, the flow of which is controlled by means of valve 36. Hydrogen passing through tube 35 bubbles through fluid 34, and is there saturated with halogenated material which, in turn, passes through tube 37, ball joint 38 and tube 21 into column 20. The vapor pressure of halogenated material 34 is kept low by means of Dewar flash 39, containing coolant material 40.

The apparatus depicted makes use of a small heater 23 particularly suitable for the zone-melting function described. For apparatus simplicity, the same heater may also be used for the reduction function and the deposition area spread out by moving the heater up and down relative to tube 20. Alternatively, a longer stationary heater may be provided for use during reduction.

A brief description of the procedures followed in accordance with the instant invention is set forth below. The exact nature is evident from the enumerated examples which follow.

Although, in the main, the improvement in impurity content and ultimate resistivity of the elemental material results from the absorption column procedure, further improvement may result from pre-treatment and subsequent procedures also reported. Each of the reported procedures is useful for the purposese set forth and may, of course, be practiced independently. Some of the auxiliary procedures were developed primarily to avoid random contamination and any other conditions which might make difficult a direct comparison between impurity levels of materials processed in accordance with the instant absorption technique and those processed by conventional means. The first such auxiliary procedure results in the removal of any sulfur compounds that may be present in the silicon tetrachloride or other halogenated starting material. In accordance with this procedure, the silicon tetrachloride is refluxed in contact with copper turnings for a period of several hours. Although relative amounts of tetrachloride and copper turnings were not found to be critical, it was found that use of 30 grams of turnings for 2000 cubic centimeters of tetrachloride resulted in satisfactory removal of sulfur. In general, any sulfur contaminant included in such starting material is given off during any refining procedure, as for example during subsequent zone-melting where it is desired to produce elemental material. The presence of such contaminant in the halide is easily detected, since upon hydrolysis it is given off in the form of hydrogen sulfide. Sulfur is not generally known to have a deleterious effect on semiconductive materials for semiconductor device use, possibly because most of it it lost during processing in any event. However, from the standpoint of a good scientific approach, it was thought advisable to process the purest possible starting material, thereby avoiding the creation of equilibria which might affect the absorption mechanism either beneficially or deleteriously.

Where halogenated materials of this invention were to be reduced to their elemental counterparts, it was found desirable to utilize a procedure alluded to above which resembled the conventional hydrogen reduction of silicon tetrachloride over a heated tantalum filament. This subsequent treatment, which was developed to avoid any contamination by the tantalum or other foreign filament material, makes use of filament of the semiconductive material which results upon reduction. Apparatus found suitable for the practice of this subsequent treatment is depicted in FIG. 2 and is described in the text corresponding with this figure. In accordance with this method, a high purity silicon single crystal filament, approximately one-eighth inch in diameter and six inches long, was suspended within a quartz tube. A second silicon support rod, which may also be a single crystal, was fixed in the lower holder and was butted up against the suspended crystal. Since high purity silicon is of too high a resistivity to be heated inductively, the lower end of the crystal was notched and a piece of heavily doped silicon containing boron was inserted and fused with the support material. After fusion, the upper crystal, referred to as the filament, was welded to the abutting lower rod by use of inductive heating, conducted along the rod length and initiating at the low resistivity site created by fusion with the boron-containing material. Hydrogen was caused to flow through the silicon tetrachloride, which was maintained at a temperature of about −20° C. The combined flow of hydrogen plus silicon tetrachloride picked up in transit was caused to flow through the entire assembly and over the filament. The center region of the filament was heated to about 1400° C. A three-inch region was heated by moving the rod-containing assembly up and down through the induction coil heater over such distance. Reduction of silicon tetrachloride by hydrogen over the portion of the filament so heated resulted in a deposit of elemental silicon on this surface. After building up an appreciable deposit of silicon, a liquid zone was established in the filament adjacent to the deposit and a zone pass carried through the deposited material to produce a single crystal. Silicon produced by hydrogen reduction in this manner was found to have a lower impurity content than material purified over tantalum by a factor of at least 10 as judged from resistivity measurements.

In the absorption procedure itself, it was found that a wide range of absorbent materials resulted in a significant improvement in impurity content. From the appended examples it is seen that the impurity content was in many instances calculated back from the resistivity measurements made on the final reduced materials. This procedure was, however, rather involved and time consuming. Resort was had to an alternate procedure to determine the class of absorbents suitable for use in the inventive process herein. In accordance with this procedure, high grade silicon tetrachloride or other halogenated material of the purest commercial grade was doped with one percent by weight of each of the two materials, boron trichloride and phosphorus trichloride. A measured amount of the material so intentionally contaminated was then allowed to drip into a ten-inch long column of the absorbent under study. After standing in the column for a prescribed period, the halogenated material was then run out of the column, also at a prescribed rate, and the eluted sample was analyzed by infrared absorption technique. The detection limit of this infrared method is about 0.01 percent. Analytical results so obtained were checked against standard untreated halogenated samples. Recognizing that the absorption efficiency of such a column might vary in accordance with the impurity level, so that results obtainable upon treatment of such doped samples might not be fairly indicative of results obtainable on undoped samples containing extremely low impurity levels, a check run was made comparing the degree of separation resulting on treatment of a doped sample with back calculated results obtained from resistivity measurements made on an undoped sample, all runs using the same absorbent. As is seen from the appended examples, the infrared technique used on the doped samples was found to be fairly indicative of separation results obtained on low impurity-containing samples as well.

Various factors indicate that the absorption phenomenon here observed is at least, in part, chemical or quasi-chemical by nature, it having been found that absorbents could not be regenerated by back flushing with dry nitrogen at temperatures of the order of 120° C. Also, where direct observation was made of the nature of the banding which occurred in the column, as was easily done where radioactive phosphorus was used as one of the intentionally added impurities (see Examples 6 and 7 below), it was found that the entire band, which initially formed very close to the top of the column, did not move down the column as is so often observed in chromatographic work. Instead, it was found that the band broadened, the lower end of the band moving down and the upper end remaining fixed.

By the same token it was found, as was to be expected, that the separation efficiency was, in large part, dependent upon surface area, improved separation being observed in large surface area materials such as gel structures as compared with similar particle-size granular materials of the same chemical nature and also gel structures in which the surface had become deactivated, as, for example, in the instance of sodium hydroxide-washed silica gel.

Where absorbents were possessed of large surface area, it was found that good separation resulted by use of any of a broad range of materials. All of these materials are considered suitable for the practice of this invention. Such materials include the oxides and silicates, both in hydrous form, as well as various forms of activated carbons, including activated charcoal. Examples of such hydrous materials are:

Aluminum oxide
Silicon dioxide
Titanium dioxide
Ferric oxide
Fuller's earth (calcium aluminum silicate)
Manganese dioxide
Chromium oxide
Calcium oxide
The rare earth oxides such as yttrium oxide
Magnesium oxide
Zeo Dur (hydrous silicate processed glauconite manufactured by the Permutit Company)

All of the above materials have a gel structure or are otherwise possessed of a high porosity surface. These materials are all well known absorbents. Surface activation treatments for these materials are well known to those skilled in the chromatographic and related arts. All such methods known to improve the surface activity of any of these absorbents are effective in the practice of this invention.

Certain additional materials were found to be effective in the removal of boron and phosphorus from the halogenated samples, although the degree of separation realized was not as great. Whereas all of the listed materials result in the reduction of impurity level to about or below the detection limits for the infrared method, the following materials were found to depress the impurity level only about one order of magnitude. Such materials include tungstic acid; Celite 545, manufactured by Johns-Manville Company (diatomaceous earth containing more than 90 percent of silica); and Decalso (a sodium alumino-silicate gel), manufatctured by the Permutit Company. It is to be understood that although the separation efficiency resulting from the use of any one of these last materials was somewhat poorer than that realized by use of any of the materials in the first category, the degree of separation was, nevertheless, clearly perceptible. Efficient separation may result even with the last materials by use of a longer column or by activation or other treatment designed to increase surface activity.

A significant class of absorbents found to be inoperative in the practice of this invention is the ion exchange resin group. Dried resins which were tried included a weak carboxylic resin type cation exchanger, a strong acid type cation exchanger, and a strong base type anion exchanger. It may be concluded from this that the absorption mechanism is not, in its essence, one of ion exchange. However, in view of the fact that Zeo Dur, a weak acid type cation exchanger, was operative as indicated above, it should be recognized that ion exchange materials having the proper surface characteristis, i.e., high porosity, and the proper chemical nature, i.e., hydrous oxides or hydrous silicates, may neverethless be operative.

In the examples below, certain indications are given as to the type of surface aggregate found to be suitable. Where certain of the gel materials enumerated above were commercially unavailable and they were made to determine the usefulness of the entire class of absorbents set forth, the procedure followed is described. In the instance of silica, it was thought desirable to make up a sample of absorbent material and check it against commercially available grades. This was done in the manner set forth below. On the whole, however, it should be recognized that use is here being made of knowledge possessed by those skilled in the various absorbent arts. It is not thought necessary to fully define the requisite surface characteristics making for a useful absorbent. It is believed that any person skilled in the art, presented with the list of suitable absorbent materials set forth above, will known how to obtain and process any of such materials so as to make them suitable for the purpose set forth. Consequently, where reference is here made to an absorbent material by its chemical nature, it is to be understood that reference is had to such material in such physical form as to have the requisite surface area. As an example, although it is indicated that silica gel is a suitable absorbent material, it is understood to a person skilled in the art that such material to be suitable must retain a porous structure. Physical forms of silica which would not be expected to be suitable and have been found to be inoperative include materials calcined at 1000° C. for a period of twenty hours, resulting in a removal of substantially all water and collapse of the gel structure, so severely limiting the surface area. Similarly, silica leached in sodium hydroxide results in surface inactivation, making it unsuitable as well. As is well known, silica intended for use as an absorbent is desirably leached in an acidic material such as 6 normal hydrochloric acid for purification and increased surface activity. Materials so prepared were found suitable.

As is seen from the experimental results reported herein, boron and phosphorus were invariably removed in substantially equal amount based on infrared detection methods as well as resistivity measurements. It has been found, however, that the removal of boron can be improved by pre-treatment of the halogenated material with aluminum chloride together with chlorine. In accordance with such procedure, powdered aluminum chloride, together with liquified chlorine, are added to the halogenated material and allowed to stand for several hours, after which the material so treated is poured off and introduced into the absorption column in the usual manner. This procedure is related to that described in J. M. Whelan U.S. Patent 2,821,460, in which this combination of materials was found to result in the efficient removal of phosphorus from silicon tetrachloride by distillation. Ranges of addition of aluminum chloride and chlorine there disclosed are operative here. In general, it has been found that from 1 to 100 grams per liter of aluminum chloride is suitable. Chlorine is conveniently added in liquified form, it having been found that from 1 to 20 cubic centimeters per liter is satisfactory. Greater amounts of aluminum chloride and chlorine are not harmful but do not aid the reaction. Smaller amounts of either additive are of decreasing effect.

As is seen from Example 1, use was made of 50 grams per liter of aluminum chloride and 10 cubic centimeters of liquid chlorine. The advantage gained in the more efficient removal of boron from a halogenated product treated in accordance with a method known to remove only phosphorus is not understood. It is noted, however, that there is some evidence indicating the existence of a boron trichloride-phosphorus trichloride complex by parallel to the boron trichloride-phosphorus pentachloride complex known to exist. It is further known from the work of J. M. Whelan (see patent citation above) that removal of phosphorus from the halogenated product by treatment with aluminum chloride and chlorine results from the formation of a complex between phosphorus pentachloride and aluminum chloride. By the fact that boron removal is improved by treatment with aluminum chloride and chlorine it may be assumed that the aluminum chloride-phosphorus chloride complex is more stable than the boron chloride-phosphorus pentachloride complex. This might conceivably indicate that boron trichloride so liberated from its complex is more easily absorbed by the column. It should be clearly understood that the methods here described, making use of alumnium chloride-chlorine pre-treatment, are based on experimental results. Dependence is in no way had on the theoretical explanation set forth above.

The following examples contain outlines of procedures followed in determining the range of suitable absorbent materials. Only satisfactory runs are set forth. Materials found unsuitable are mentioned above and are excluded from the enumerated class.

The examples set forth below were chosen from the experimental runs as demonstrating the suitability of a broad range of absorbent materials. Certain of the examples include various of the pre-treatment and subsequent treatment techniques described above. Where such auxiliary treatment is included in an example, it should be understood that parallel runs utilizing the same absorbent materials were conducted without such auxiliary treatment. Such additional runs, which are not included to economize on space, indicated that the major purification resulted from the absorption technique and not from one or more of the auxiliary treatments. The main exception to this is pre-treatment with aluminum chloride and chlorine which, as indicated above, resulted in a perceptible increase in boron removal. Procedures utilizing such aluminum chloride-chlorine pre-treatment are, therefore, considered preferred in accordance with this invention. As is set forth above, other of the auxiliary treatments were designed to clarify results and to simplify comparison with untreated materials. Accordingly, treatment with copper turnings resulted in the removal of sulfur compounds. Hydrogen reduction over silicon or germanium, while a useful process and certainly preferable to the now commonly used procedure in accordance with which reduction is carried out over tantalum, does not result in the further purification of the silicon tetrachloride or resulting elemental counterpart, but only avoids the introduction of further impurities from the tantalum or other foreign materials inherent in the reaction system including the leaching agents used to remove filamentary material. All auxiliary procedures set forth are believed novel and constitute a part, however minor or optional, of the instant invention.

*Example 1*

2220 grams of Stauffer Chemical Company silicon tetrachloride containing traces of boron, phosphorus and heavy metal chloride as impurities was refluxed overnight in contact with 30 grams of copper turnings to remove the sulfur compounds. Removal of such contaminants is indicated by blackening of the copper due to the formation of copper sulfide. The copper turnings were then removed and 50 grams per liter of anhydrous aluminum chloride and 0.001 percent radioactive phosphorus trichloride, together with 10 cubic centimeters per liter of liquefied chlorine, were added to the silicon tetrachloride.

The radioactive phosphorus was added so that tracer studies could be made during the course of the purification as set forth in Example 7. As is set forth above, such addition results in the formation of a coordination compound between phosphorus pentachloride and aluminum chloride in accordance with teachings of J. M. Whelan Patent 2,821,460. The silicon tetrachloride, together with added materials, was allowed to stand for a period of about eighteen hours to ensure that the reaction was completed. The silicon tetrachloride was then added to the reservoir of an absorption column of the type shown in FIG. 1 by means of a siphon containing a glass wool plug to entrain any solid aluminum chloride. This column was of a diameter of seven-eighths inch inside diameter and was packed to a height of twenty inches with 80–200 mesh $Al_2O_3$ Grade F–20 supplied by the Aluminum Company of America. Prior to use, the $Al_2O_3$ was activated by heating in air at 270° C. for eighteen hours. The column was filled with silicon tetrachloride and was allowed to stand for sixteen hours, after which the liquid was allowed to percolate through the column at the rate of 1 cubic centimeter per minute. The silicon tetrachloride was then used to prepare a silicon rod by conventional hydrogen reduction over tantalum (see R. Hölvling, Zeitschrift für angewandte Chemie 40, page 655 [1927]), using tantalum tubing 0.050 inch in diameter having a wall thickness of 0.003 inch and a length of 11 inches. The technique used is described in greater detail in Bell Telephone Laboratories Record for September 1955, at pages 327–30. The resulting silicon was leached in 48 percent hydrofluoric acid to remove the tantalum, was etched in a mixture of three volumes of 70 percent nitric acid and one volume of 48 percent hydrofluoric acid and was then washed in deionized water. The silicon rod was then given thirty passes in a floating zone apparatus in a hydrogen atmosphere to remove residual phosphorus and to grow a single crystal. The floating zone procedure is described elsewhere. See Journal of Metals, volume 8, pages 1316–19. The crystal so treated was found to be p-type with a resistivity at the lead end of 85,000 ohm-cm. and a resistivity of 10,000 ohm-cm. further along the rod, where separation of boron was not as efficient. By comparison, a control run utilizing silicon tetrachloride purified by distillation only had a lead-end resistivity of 4700 ohm-cm. and 1200 ohm-cm. further along the rod. In both instances, the higher resistivity at the lead end corresponds with the area of most efficient zone refining.

*Example 2*

A sample of silicon tetrachloride was treated with copper in the manner described in Example 1. It was then purified by passing through a column as before except that the absorbent was 6–15 mesh silica gel obtained from the Amend Drug Company. Prior to use, the gel was leached with 6 normal hydrochloric acid for twenty-four hours, washed free of hydrochloric acid with deionized water, dried at 110° C. and activated for four hours at 300° C. The silicon tetrachloride was then reduced by hydrogen reduction over a silicon filament in apparatus of the type depicted in FIG. 2. In accordance with this method, a high purity silicon single crystal filament approximately one-eighth inch in diameter and six inches long was suspended within a quartz tube from a nickel holder. A silicon rod was then fixed in a quartz holder at the bottom of the apparatus and was held in place by a nickel chuck in the lower head. Since high purity silicon cannot be heated directly by reduction, the lower end of the silicon rod was notched, a piece of heavily doped silicon-containing boron was inserted in the notch, and the two were fused. This doped region could then be directly heated and the heat transferred up the crystal without melting. The lower rod was then butted to the silicon filament and was aligned by adjustments made by manipulating the upper head in the ball joint and by adjusting the knurled knob on the threaded portion of the upper holder. A weld was then made in dry hydrogen by transferring heat from the lower end of the rod to the junction with the filament using the induction coil and a 5 megacycle generator. A flask containing about 250 cubic centimeters of silicon tetrachloride was then attached to the apparatus and was refrigerated to about −20° C. Hydrogen was caused to flow through the silicon tetrachloride and from there into a quartz tube at a flow rate of about 2 liters per minute. The center region of the filament was heated to 1400° C. by transferring heat from the lower rod by moving the entire apparatus back and forth through the induction coil over a three-inch center section of the filament, the relative movement rate being about 0.02 inch per minute. A dense layer of deposited silicon resulted in an increase in rod diameter to about 0.4 inch in about four hours. The hydrogen flow was then reduced to about 0.5 liter per minute and the filament was melted just below the deposited region to produce a molten zone which was then moved up the rod at a rate of about 0.05 inch per minute to fuse the deposited material and convert it to a single crystal. To prevent transfer of gaseous impurities from the quartz wall of the apparatus and to prevent deposition of silicon on the wall, the furnace tube was cooled by a water curtain produced by directing a jet of water onto the tube several inches above the induction coil. A funnel drain was provided to collect the water at the lower end of the apparatus. The resultant silicon body was then single-pass zone-melted and was observed to be p-type having a resistivity of 44,700 ohm-cm.

*Example 3*

185 cubic centimeters of silicon tetrachloride of the type used in the examples above was doped with 0.001 percent of radioactive phosphorus chloride and was passed through a column packed with 6–12 mesh silica gel. The column dimensions in this example were one-half inch O.D., and the length of the packed section was ten inches. The adsorbent was activated as set forth in Example 2 and the silicon tetrachloride was allowed to percolate through the column at the rate of about 0.5 cubic centimeter per minute. Radioactive tracer techniques indicated that the phosphorus trichloride content was reduced to $7.5 \times 10^{-5}$ mol percent. Radiographs of the column indicated that even these results could be improved by proper regulation of particle size and packing conditions, since indications were that considerable "channeling" had occurred throughout the absorbent.

*Example 4*

Example 3 was rerun, substituting 6–12 mesh alumina for the silica gel. Results were similar to those of Example 3.

*Example 5*

Example 3 was rerun, substituting 60–200 mesh silica gel (Grade 950 Davison Chemical Company) for the 6–12 mesh silica of Example 3 and using a column seven-eighths inch I.D. packed for a length of 20 inches. Apparatus dimensions and processing conditions were otherwise identical with those set forth in Example 3. The smaller particle size silica resulted in a $PCl_3$ reduction from 0.001 volume percent to $5.3 \times 10^{-6}$ mol percent.

*Example 6*

60–200 mesh activated alumina was substituted for the silica of Example 5. A 185 cubic centimeter sample of silicon tetrachloride was doped to a 0.001 percent phosphorus chloride content, as above. Passing this sample through the alumina column in the manner described in the above samples resulted in a reduction of phosphorus chloride content to $5.9 \times 10^{-8}$ mol percent, the detection limit for the radioactive counting technique. After passage of 1500 cubic centimeters of silicon tetrachloride so treated, the phosphorus content of the eluent had increased to $3.4 \times 10^{-6}$ mol percent of phosphorus chloride. Radiographs made of the column showed a heavy phosphorus concentration about three inches down from the top of the packed portion and no visible channeling.

*Example 7*

The procedure followed in Example 6 was duplicated, however, with the addition of 10 cubic centimeters of liquid chlorine per liter of silicon tetrachloride to the sample prior to passing through the absorption column. The eluent showed no detectable phosphorus, indicating a reduction to less than $6.6 \times 10^{-7}$ mol percent. After passage of 3000 cubic centimeters of silicon tetrachloride so doped, radiographs made of the packing showed a tight band of phosphorus extending one-half inch down from the top of the column. On this basis it was estimated that the column would be capable of purifying at least 30,000 cubic centimeters of silicon tetrachloride before elution of silicon tetrachloride containing detectable phosphorus.

*Example 8*

A silicon tetrachloride sample was prepared as in Example 6. 50 grams per liter of anhydrous aluminum chloride, together with 10 cubic centimeters of liquid chlorine per liter, both based on silicon tetrachloride, was added and the sample was allowed to stand for twenty-four hours. The eluent so treated was free of detectable phosphorus. As in Example 6, passage of 3000 cubic centimeters of such pre-treated silicon tetrachloride through the column in the manner described resulted in a tight band of phosphorus one-half inch down from the top of the packed column.

*Example 9*

In order to check the relative effectiveness of various absorbents for the removal of boron trichloride and phosphorus trichloride from silicon tetrachloride, the following method was used. 50 milliliter burettes, twenty-four inches long and one-half inch inside diameter, were packed to a height of ten inches by various absorbents tested. 30 cubic centimeter samples of silicon tetrachloride doped with one percent each of boron trichloride and phosphorous trichloride were allowed to drip into each packed burette from pipettes at a rate of 1 cubic centimeter per minute. After such addition, the columns were allowed to stand for one hour. 10 cubic centimeter samples of silicon tetrachloride so treated were then withdrawn from each burette at a rate of about 0.8 cubic centimeter per minute. A second set of samples, comprising all of the drainable silicon tetrachloride, was collected. Untreated and eluted samples were analyzed using infrared absorption techniques. A strong absorption band for $PCl_3$ had a wavelength of 1313 cm.$^{-1}$ and bands for $BCl_3$ were found at 1415, 1368 and 1345 cm.$^{-1}$. The detection limit for these bands, were the method used, was 0.01 percent.

*Examples 10 Through 13*

| Example | Absorbent | First 10 cc. Eluted $SiCl_4$ | Drainable $SiCl_4$ |
|---|---|---|---|
| 10 | 6-16 mesh silica gel activated 260° C. for 16 hrs. | <0.01% $BCl_3$, <0.01% $PCl_3$. | <0.01% $BCl_3$, <0.01% $PCl_3$. |
| 11 | 8-14 mesh $Al_2O_3$ activated 260° C. for 16 hrs. | <0.01% $BCl_3$, <0.01% $PCl_3$. | <0.01% $BCl_3$, <0.01% $PCl_3$. |
| 12 | Coconut charcoal 6-14 mesh activated 300° C. for 4 hrs. | <0.01% $BCl_3$, 0.1% $PCl_3$. | 0.01% $BCl_3$, 0.01% $PCl_3$. |
| 13 | 6-16 mesh silica gel HCl washed, dried, activated 300° C. for 4 hrs. | <0.01% $BCl_3$, <0.01% $PCl_3$. | <0.01% $BCl_3$, <0.01% $PCl_3$. |

A more rapid procedure was developed to determine the effectiveness of a broad class of absorbent materials. In accordance with this procedure, 1000 cubic centimeters of silicon tetrachloride was doped with 1 percent of $BCl_3$, together with 1 percent of $PCl_3$. 20 cubic centimeter portions of such starting material, together with 5 cubic centimeters of the absorbent to be tested, was placed in Erlenmeyer flasks. The flasks containing such samples were stoppered and allowed to stand for one hour in an ice bath with intermittent agitation. At the end of this period, the silicon tetrachloride was drained from the absorbents by filtering through glass wool. The treated material was analyzed by infrared techniques as in Examples 9 through 12. Results are tabulated below:

*Examples 14 Through 24*

| Example | Absorbent | Impurity Content After Treatment |
|---|---|---|
| 14 | 6-12 mesh silica gel, HCl leached, washed, activated 270° C. for 16 hrs. | <0.01% $BCl_3$, 0.01% $PCl_3$. |
| 15 | 8-14 mesh alumina, HCl leached, washed, activated 270° C. for 16 hrs. | 0.1% $BCl_3$, 0.1% $PCl_3$. |
| 16 | 8-14 mesh alumina, NaOH leached, washed, activated 270° C. for 16 hrs. | 0.1% $BCl_3$, 0.1% $PCl_3$. |
| 17 | About 12 mesh $TiO_2$ gel | <0.01% $BCl_3$, <0.01% $PCl_3$. |
| 18 | About 12 mesh $Fe_2O_3$ | <0.01% $BCl_3$, <0.01% $PCl_3$. |
| 19 | About 100 mesh fuller's earth | <0.01% $BCl_3$, <0.01% $PCl_3$. |
| 20 | About 100 mesh tungstic acid | 0.1% $BCl_3$, 0.1% $PCl_3$. |
| 21 | About 100 mesh $Mg(OH)_2$ | 0.01% $BCl_3$, 0.01% $PCl_3$. |
| 22 | Zeo Dur (about 6 mesh hydrous silicate) prepared by Permutit Company. | 0.01% $BCl_3$, 0.01% $PCl_3$. |
| 23 | Celite 545 (about 100 mesh diatomaceous earth containing at least 90% of silica) prepared by Johns Manville Company. | 0.1% $BCl_3$, 0.1% $PCl_3$. |
| 24 | Decalso (about 100 mesh sodium aluminum silicate) manufactured by Permutit Company. | 0.1% $BCl_3$, 0.1% $PCl_3$. |

*Example 25*

Approximately 200 cubic centimeters of germanium tetrachloride was prepared by treatment of germanium dioxide known to be unsuitable for seimconductive use with 6 normal hydrochloric acid, after which the germanium tetrachloride was removed by distillation. To further contaminate the halogenated material, 5 milligrams of $As_2O_3$ dissolved in 10 cubic centimeters of 12 normal hydrochloric acid was added. The material was allowed to stand for eighteen hours, after which the hydrochloric acid was separated from the germanium tetrachloride by extraction. 25 cubic centimeters of $GeCl_4$ so prepared was set aside as a control sample. 50 cubic centimeters of the same material was allowed to percolate through a one-half inch silica gel column and packed to the height set forth in Example 1. The rate was 0.5 cubic centimeter per minute. The silica gel absorbent here used had been leached with 6 normal hydrochloric acid for approximately seventy hours, washed with deionized water, dried at 120° C. and activated at 270° C. for sixteen hours. The control sample and a 25 cubic centimeter sample of eluent were separately hydrolysed in 150 cubic centimeters of deionized water. The resulting germanium dioxide was washed and dried at 120° C. overnight. The germanium dioxide samples were then reduced in hydrogen at 650° C. in a quartz boat. The elemental germanium was next melted and converted to directionally solidified ingots. The relative purity of the two ingots was established by means of resistivity measurements. The average resistivity of the unpurified material was 0.003 ohm-cm., compared with 0.40 ohm-cm. for the purified material, indicating two orders of magnitude improvement or a factor of improvement greater than 100. Material so processed was considered to be of semiconductor grade.

*Example 26*

The procedure of Examples 14 through 24 was applied to a sample of silicon chloroform ($SiHCl_3$) which had been doped with 1 percent each of $BCl_3$ and $PCl_3$. Use of 6-16 mesh silica gel resulted in the reduction of both $BCl_3$ and $PCl_3$ to the 0.1 percent level.

*Example 27*

The procedure of Example 26 was rerun on a similarly doped sample of silicon chloroform using 80-200 mesh alumina, activated at 270° C. for 18 hours. $BCl_3$ and $PCl_3$ levels were each reduced to about 0.1 percent.

*Example 28*

A sample of silicon chloroform was purified by use of the column described in Example 25 packed with 60-200 mesh silica gel (Davison Chemical Company Grade 950), and activated at 270° C. for 18 hours. The silicon chloroform was percolated through the column at the rate of 0.55 cubic centimeter per minute and was then reduced over a silicon rod using the procedure of Example 2. The material in the deposited region was n-type, of a resistivity averaging 850 ohm-cm. A similar rod made from a control sample of the initial material was of p-type conductivity and of a resistivity averaging 1400 ohm-cm. After such measurements were made, both rods were given one additional zone pass in a vacuum of $5 \times 10^{-6}$ millimeters of mercury by floating zone technique to remove phosphorus. The rod produced from the purified silicon chloroform was of p-type with a resistivity averaging 1500 ohm-cm., while the control rod was p-type of a resistivity of 1000 ohm-cm. On the basis of this data, it was concluded that the silicon chloroform used was quite pure initially, containing traces of both boron and phosphorus chloride. From comparative conductivity type and resistivity measurements before and after zone-melting, it appeared that the absorption technique did result in improvement, particularly in the removal of boron.

*Example 29*

The following experiment was conducted to determine the effectiveness of the column technique in the removal of heavy metal chlorides from silicon tetrachloride: After 6000 cubic centimeters of silicon tetrachloride had passed through the silica gel column of Example 1, the column was drained of residual liquid and 1 inch samples of absorbent were removed at various locations in the column. These samples were hydrolysed in deionized water, were dried at 150° C. for 16 hours and were analyzed spectrochemically. Tests made for six metals on samples removed from three positions in the column are set forth below:

| Metal | 1 inch top section | 4 inches from top | 1 inch bottom section |
|---|---|---|---|
| Aluminum | VST | ND | ND |
| Boron | VST | VST | ND |
| Copper | VST | VST | ND |
| Iron | ST | VST | ND |
| Magnesium | ST | VST | VST |
| Manganese | VST | VST | ND |

The designations reported in tabular form above are conventionally used in spectrochemical analysis. Definitions follow:

ST—slight trace, less than 0.005% by weight
VST—very slight trace, less than 0.001% by weight
ND—not detected

*Example 30*

Silicon tetrachloride was treated with copper turnings as described in Example 1. Using the same absorbent material and column as in Example 1, the liquid was introduced to the column reservoir and allowed to percolate through the column as before. The liquid material was poured off, and the steps set forth in Example 1 were carried out. After 36 passes by floating zone-melting, the silicon was found to be p-type with a resistivity of 8000 ohm-cm. at the lead end and 1800 ohm-cm. further along.

*Example 31*

The procedure of Example 30 was repeated, substituting 6–16 mesh silica gel activated as in Example 2 as the absorbent. The resulting silicon rod was p-type with a resistivity of 11,000 ohm-cm. at the lead end and 4000 ohm-cm. further along the rod.

In the course of the studies reported herein, it was deemed desirable to try two gel structure materials which were apparently not commercially available. As a check on some of the runs which had been made, it was decided also to prepare a gel structure which was commercially advailable and to then check the absorbent power of the synthesized material with that of the commercial material. (See Example 32.) The methods actually used in the preparation of these three absorbent materials are set forth below. The parenthetical reference to an example number in each description indicates that example in which the prepared absorbent was used.

*Example 32*

Silica gel approximately 6–12 mesh, prepared as noted below was washed with deionized water, dried at 110° C. and activated at 270° C. for 18 hours and was utilized as the absorbent in a rerun of Example 14. Similar purification was obtained.

*Preparation of titanium dioxide gel (Example 17).*—25 cubic centimeters of tetraisopropyl titanate was stabilized against rapid hydrolysis by the addition of 5 cubic centimeters of 12 normal hydrochloric acid to which stabilized solution 75 cubic centimeters of deionized water was added with stirring. The mixture was then heated to 80° C. to bring it into solution. Without cooling, ammonium hydroxide was added by dripping until a gelatinous curdy precipitate formed. The material was allowed to stand and cool to room temperature. Upon standing for several hours, the curds stiffened. The material was made strongly alkaline (pH of about 10) by the addition of ammonium hydroxide, after which it was allowed to stand overnight. After washing with deionized water, the curd was then dried for two days in a vacuum desiccator, followed by drying in air at 100° C. for twenty-hour hours and activation in air at 270° C. for eighteen hours. The material was then put into use as an absorbent.

*Preparation of ferric oxide ($Fe_2O_3$) (Example 18).*—About 100 grams of $Fe(OH)_3$ was dissolved in an excess of 6 normal hydrochloric acid. The solid material which formed was removed by filtration. The remaining liquid was made basic with ammonium hydroxide (pH of about 10) resulting in the formation of a gelatinous precipitate. The precipitate was filtered and washed in deionized water to remove any ammonium chloride and ammonium hydroxide. The material was then dried for twenty-four hours in air at 120° C. and was activated in air at 270° C. for four hours.

*Preparation of silica (Example 32).*—50 cubic centimeters of silicon tetrachloride was slowly dripped into 500 cubic centimeters of deionized water at a temperature of about 0° C. The resultant opalescent liquid set to a stiff gel in two hours at room temperature. After standing overnight, the material was broken up with a stirring rod, washed with deionized water to remove hydrochloric acid and dried for two days in a vacuum desiccator. Finally, the material was dried in air at 110° C. for twenty-four hours and was activated at 270° C. in air for eighteen hours.

It is interesting to note that all of the absorbent materials of the above examples contain water of hydration. That all absorbents useful for the purposes herein must contain such attached water has been clearly established. Accordingly, whereas silica gel, activated at 270° C. and of the approximate formula $SiO_2 \cdot 0.18H_2O$ was effective, calcined silica containing little or no water of hydration was inoperative. Admittedly, in the instance of silica there is an accompanying gel structure collapse, so that the loss of absorbent power might be explained on the basis of physical characteristics. However, the same phenomenon has been observed in the instance of a non-gel structure absorbent, magnesia. In this instance, it was found that although anhydrous magnesium oxide was ineffective and did not result in a perceptible decrease in impurity level, such material containing one molecule of water of hydration, $Mg(OH)_2$, was quite effective in reducing the boron and phosphorus level both, to the approximate detection level of the infrared analytical technique used with such measurement. (See Example 21.)

Most of the experimental work described above was conducted on samples which had been deliberately contaminated with impurities which may be removed from the material of concern only with difficulty. Accordingly, boron and phosphorus were added to the halogenated silicon materials such as silicon tetrachloride and silicon chloroform, while arsenic was added to the corresponding germanium material. In all such runs, the impurity level so augmented was appreciably decreased, often to below the detection limit of the particular analytical procedure used. Certain of the runs reported below, however, such as Examples 2, 30 and 31, relate to work which was conducted on the purest commercially available silicon tetrachloride. In these runs, of course, standard analytical procedure was useless in determining the final impurity levels. In such instances, the final purified material was reduced to its elemental counterpart by hydrogen reduction, either over tantalum or silicon as described, followed by one or more passes by floating zone technique. Resistivity measurements made on such samples are, of course, of great significance, especially where the material so purified and reduced is to be used in a semiconductor device.

However, it is not expected that commercial use of the instant invention will be limited to the preparation of elemental materials intended for such use. For example, silicon tetrachloride may be an initial or intermediate product in a process intended for the production of silane. (See Journal of American Chemical Society, volume 69, pages 2692–6, November 1947.)

It is known that the major impurities in the halogenated starting material were born and phosphorus. Both of these materials are significant impurities in the silicon system, are of opposite conductivity-inducing type, and have differing distribution coefficients between liquid and solid phases in a silicon system. As a consequence, it is possible, after running a determined number of zone passes through a body of such material and after making resistivity and conductivity measurements at various positions in the direction of progression of such zones, to calculate back and determine the total number of acceptor impurity atoms (boron) and the total number of donor impurity atoms (phosphorus). Such calculations have been made for the final materials corresponding with Examples 1 and 30 through 32. These calculations are summarized below.

| Example | Absorbent | No. of Acceptor Atoms, Atoms per Cubic Centimeter | No. of Donor Atoms, Atoms per Cubic Centimeter |
|---------|-----------|-------------------------------------------------|------------------------------------------------|
| 1 | $Al_2O_3$ ($AlCl_3+Cl_2$) | $1.4 \times 10^{12}$ | $1.9 \times 10^{12}$ |
| 30 | $Al_2O_3$ | $7.2 \times 10^{12}$ | $3.1 \times 10^{14}$ |
| 31 | $SiO_2$ | $5.6 \times 10^{12}$ | $5.8 \times 10^{12}$ |
| 32 | $SiO_2$—Charcoal $AlCl_3+Cl_2$ | $1.4 \times 10^{12}$ | $1.4 \times 10^{14}$ |

As is seen from the above description, any of a broad grouping of absorbent materials are suitable in the practice of this invention. Regardless of which absorbent material or combination of materials is selected, separation may be found improved or subsequent contamination avoided by use of any of the various pre-treatment and subsequent treatment procedures described. Most outstanding of the preliminary treatment procedures is that in accordance with which chlorine and aluminum chloride are first added to the halogenated material. Such pre-treatment resulted not only in the expected improved banding of phosphorus now in the form of the pentachloride but also in improved boron removal in accordance with a mechanism not completely understood.

As is seen from a comparison of Examples 2 and 31, contamination during reduction after absorption treatment or after any prior art treatment, may be minimized by reducing directly onto a silicon rod rather than onto a foreign material such as tantalum which must subsequently be removed. Apparatus suitable for such use is depicted in FIG. 2 and is described in the corresponding text material.

The absorbent materials which were found useful in the practice of the instant invention are all hydrous materials. These materials, which are all oxides or silicates with the sole exception of charcoal, are known to have hydroxyl groupings attached to their surfaces. As is known by persons skilled in the art charcoal may have absorption characteristics similar to such hydrous oxides and silicates. In addition to having the requisite chemical nature, as described herein, and as illustrated by the examples, it is, of course, necessary that the materials chosen have the physical characteristics requisite to a good absorbent. No attempt is made to comprehensively define such requisite characteristics, all of which are well known to persons skilled in the chromatographic arts. Certain of these characteristics are, however, inherent in this disclosure. For example, it has been noted that a gel structure presents effective absorbent surface for these purposes. It is also noted, however, that such material must be dried and activated to remove what is generally referred to as physically entrapped water. It has also been noted that the absorbent power of such gel materials is substantially lowered upon calcining, which results in a collapse of the gel structure and consequent restriction of effective surface area. It is also seen that treatment of an absorbent material with a reagent which has the effect of reacting with or physically blocking the free surface destroys its absorbent power so that leaching of silica gel with sodium hydroxide renders this material useless for the purposes of this invention. Whether the absorbent material chosen is or is not possessed of a gel structure, it is, of course, advantageous to use as fine a particle size as is feasible. So, for example, it is seen from a comparison between Examples 3 and 5, and also 4 and 6, that use of a 60–200 mesh material results in a significant improvement in separation as compared with a 6–12 mesh material, otherwise of identical chemical and physical nature.

It is believed that the enumerated examples and other described work are of sufficient scope to support the conclusion that absorbents useful in the instant invention are those belonging to the hydrous oxide and hydrous silicate materials suitable for use herein. Requirements of this bonaceous materials known to exhibit surface reaction characteristics of materials of such groupings. Where reference is had to materials of this class in the description and the appended claims, it is, of course, to be understood that materials so intended must, in other respects, have characteristics, both physical and chemical, making such materials suitable for use herein. Requirements of this nature include those described in the preceding paragraph. Other requirements, also considered obvious, are that the material chosen should not be significantly soluble in or otherwise react with the halogenated material undergoing processing and that such absorbent should not contain contaminants considered harmful to the system under treatment.

It may also be noted that mixed absorbent beds are effective in the inventive processes herein. In this connection, a bed of $SiO_2$, charcoal and $AlCl_3$ was effectively used in a run which was in other respects similar to that of Example 1 with as good results.

Other common column techniques may advantageously be used in conjunction with the described processes. For example, flow may be improved by the use of conventional filter aid materials. Also, separation may be improved by cooling and column dimensions may be varied or multiple columns used in succession.

What is claimed is:

1. In a process for reducing a liquid phase chlorine-containing compound of silicon selected from the group consisting of silicon tetrachloride and the chlorosilanes, the steps comprising adding chlorine to the said material, adding aluminum chloride to the said material while in the liquid phase, and passing the material through a packed column having a packing comprising at least one absorbent selected from a group consisting of hydrous oxides, hydrous silicates and charcoal, and finally reducing the material so processed by vapor phase hydrogen reduction on a silicon body.

2. Process in accordance with claim 1 in which the said chlorine and aluminum chloride are added to the said material prior to passing through the column.

3. Process for purifying a liquid phase chlorine-containing compound of silicon selected from the group consisting of silicon tetrachloride and the chlorosilanes comprising adding chlorine and aluminum chloride to the said material, discarding unreacted aluminum chloride, and passing the material so processed while in the liquid phase through a packed column having a packing comprising at least one absorbent selected from a group consisting of hydrous oxides, hydrous silicates and charcoal.

References Cited in the file of this patent

UNITED STATES PATENTS

| | | |
|---|---|---|
| 2,207,597 | Pechukas | July 9, 1940 |
| 2,224,061 | Pechukas | Dec. 3, 1940 |
| 2,592,021 | Frey et al. | Apr. 8, 1952 |
| 2,821,460 | Whelan | Jan. 20, 1958 |
| 2,854,318 | Rummel | Sept. 30, 1958 |
| 2,947,607 | Pohl | Aug. 2, 1960 |
| 2,970,040 | Conn | Jan. 31, 1961 |

FOREIGN PATENTS

| | | |
|---|---|---|
| 627,904 | Great Britain | Aug. 18, 1949 |
| 777,539 | Great Britain | June 26, 1957 |